(12) United States Patent
Satou

(10) Patent No.: US 12,235,620 B2
(45) Date of Patent: Feb. 25, 2025

(54) CONTROLLER, CONTROL SYSTEM, AND CONTROL METHOD OF MACHINE TOOL

(71) Applicant: FANUC CORPORATION, Yamanashi (JP)

(72) Inventor: Junya Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 370 days.

(21) Appl. No.: 17/906,977

(22) PCT Filed: Mar. 24, 2021

(86) PCT No.: PCT/JP2021/012272
§ 371 (c)(1),
(2) Date: Sep. 22, 2022

(87) PCT Pub. No.: WO2021/193728
PCT Pub. Date: Sep. 30, 2021

(65) Prior Publication Data
US 2023/0176539 A1   Jun. 8, 2023

(30) Foreign Application Priority Data
Mar. 26, 2020 (JP) .................. 2020-056665

(51) Int. Cl.
*G05B 19/402* (2006.01)
*B23Q 15/12* (2006.01)

(52) U.S. Cl.
CPC .......... *G05B 19/402* (2013.01); *B23Q 15/12* (2013.01); *G05B 2219/43132* (2013.01)

(58) Field of Classification Search
None
See application file for complete search history.

(56) References Cited

U.S. PATENT DOCUMENTS 5,224,404 A  7/1993 Kono et al.
6,298,758 B1  10/2001 Wu
(Continued)

FOREIGN PATENT DOCUMENTS

CN   106255571 A   12/2016
CN   108723890 A   11/2018
(Continued)

OTHER PUBLICATIONS

International Search Report in PCT/JP2021/012272, mailed Jun. 15, 2021. 3pp.

*Primary Examiner* — Ryan A Jarrett
(74) *Attorney, Agent, or Firm* — HAUPTMAN HAM, LLP

(57) ABSTRACT

A time necessary for phase alignment is shortened in a polygon machining device having a plurality of cutting tools. In phase alignment of polygon machining, a phase $R_{CURRENT}$ of the workpiece axis and tool axis before phase alignment and a machining-allowing phase command value $R_{NEW}(n)$ are calculated, a new phase command value $R'_{NEW}$ is calculated while considering restrictions such as a phase alignment method and a maximum rotation speed. By adjusting a phase to the new phase command value $R'_{NEW}$, a time necessary for phase alignment can be shortened.

6 Claims, 12 Drawing Sheets

(56) References Cited

U.S. PATENT DOCUMENTS

| | | | |
|---|---|---|---|
| 11,378,933 B2* | 7/2022 | Watanabe | G05B 19/404 |
| 2006/0081097 A1 | 4/2006 | Schneider et al. | |
| 2016/0039009 A1 | 2/2016 | Matsumaru | |
| 2016/0045959 A1 | 2/2016 | Matsumaru | |
| 2017/0102685 A1 | 4/2017 | Kitakaze et al. | |
| 2018/0307196 A1 | 10/2018 | Oho et al. | |
| 2019/0310603 A1 | 10/2019 | Sonoda et al. | |

FOREIGN PATENT DOCUMENTS

| | | | |
|---|---|---|---|
| CN | 110347118 A | 10/2019 | |
| JP | S59188103 U | 12/1984 | |
| JP | S6399114 A | 4/1988 | |
| JP | S63105802 A | 5/1988 | |
| JP | H2181805 A | 7/1990 | |
| JP | H3109701 U | 11/1991 | |
| JP | H4164557 A | 6/1992 | |
| JP | 2008-264937 A | 11/2008 | |
| JP | 2014-188665 A | 10/2014 | |
| JP | 2014188660 A | 10/2014 | |

\* cited by examiner

CURRENT POSITION Y OF WORKPIECE AND CURRENT
POSITION OF TOOL BEFORE START OF PHASE ALIGNMENT

WORKPIECE
AXIS

TOOL AXIS

ROTATION RATIO P:Q = 1:2
PHASE COMMAND VALUE R = 60
NUMBER T OF CUTTING TOOLS = 3

PHASE COMMAND VALUE R = 90 (DEGREES)
WORKPIECE AXIS 0 DEGREES, TOOL AXIS 195 DEGREES

WORKPIECE AXIS

TOOL AXIS

CONVENTIONAL TECHNOLOGY

PHASE ALIGNMENT

WORKPIECE AXIS

TOOL AXIS

AMOUNT OF CHANGE IN PHASE

PHASE COMMAND VALUE R = 90 (DEGREES)
WORKPIECE AXIS 0 DEGREES, TOOL AXIS 195 DEGREES

WORKPIECE
AXIS

TOOL
AXIS

PHASE COMMAND VALUE R = 210 (DEGREES) (CHANGE PHASE COMMAND VALUE)
WORKPIECE AXIS 0 DEGREES, TOOL AXIS 195 DEGREES

WORKPIECE
AXIS

TOOL
AXIS

MACHINING WITHOUT
PHASE ALIGNMENT

MACHINED SURFACE
IS SHIFTED

MACHINING WITH PHASE
ALIGNMENT

MACHINING

CONTROLLER, CONTROL SYSTEM, AND CONTROL METHOD OF MACHINE TOOL

RELATED APPLICATIONS

The present application is a National Phase of International Application No. PCT/JP2021/012272, filed Mar. 24, 2021, which claims priority to Japanese Application No. 2020-056665, filed Mar. 26, 2020.

TECHNICAL FIELD

The present invention relates to a controller, a control system, and a control method for controlling polygon machining performed by a tool including a plurality of cutting tools.

BACKGROUND ART

Conventionally, there has been polygon machining for machining an outer peripheral surface of a workpiece into a polygonal shape by rotating a tool and the workpiece at a constant ratio. In polygon machining, the surface of the workpiece is machined into a polygonal shape by adjusting the number of cutting tools and a rotation ratio between a tool axis and a workpiece axis. For example, when the number of cutting tools attached to the tool axis is two, and the rotation ratio between the workpiece axis and the tool axis is 1:2, the tool axis rotates twice while the workpiece axis rotates once, and two cutting tools each cut two places, cutting a total of four places, so that the outer peripheral surface of the workpiece becomes a quadrangle. When the number of tools attached to the tool axis is three, and the rotation ratio between the workpiece axis and the tool axis is 1:2, the outer peripheral surface of the workpiece becomes a hexagon.

In a machine tool that performs polygon machining, a workpiece axis and a tool axis may be phase-aligned in order to perform accurate cutting. For example, when finishing is performed by changing a rotation speed, machining is performed so that a polygonal apex is formed at a specific position on a side surface of the workpiece, or the workpiece and the tool are once separated and then re-machined from another position after rough-machining the workpiece, the workpiece axis and the tool axis need to be rotated to have a constant phase (relative angle) (for example, the workpiece axis and the tool axis are rotated so that, when the workpiece axis is 0 degrees, the tool axis becomes 90 degrees).

As an example, when both ends of the workpiece are each machined into a hexagonal shape as illustrated in FIG. 11A, it is necessary to align a surface to be machined on one end side with a surface to be machined on the other end side. When the workpiece axis and the tool axis are out of phase, the machined surface is out of phase as illustrated in FIG. 11B. When phase alignment is necessary, as illustrated in FIG. 11C, machining is started after the phases of the workpiece axis and the tool axis are aligned.

Patent Document 1 describes that "by simply stopping a spindle at a predetermined fixed position such as the origin of the spindle, it is possible to easily perform polygon machining in which it is necessary to mutually align a predetermined positional relationship with respect to an outer peripheral surface of a workpiece W."

PATENT DOCUMENT

Patent Document 1: JP 2014-188660 A

SUMMARY OF THE INVENTION

Problem to be Solved by the Invention

The technology described in Patent Document 1 synchronizes phases of a plurality of times of machining by stopping a tool at a predetermined position. However, in the technology of Patent Document 1, it is necessary to temporarily stop the tool.

When phase alignment is performed while the workpiece axis and the tool axis are rotated, the phase is shifted by accelerating or decelerating the workpiece axis or the tool axis. At this time, when a phase difference before and after phase alignment is large, as illustrated in FIGS. 9A and 9B, the amount of phase shift becomes large, and a time necessary for phase alignment becomes long.

In a polygon machining device having a plurality of cutting tools, a technology for shortening a time necessary for phase alignment is desired.

Means for Solving Problem

A controller of an aspect of the disclosure is a controller for controlling a machine tool having a first axis for rotating a tool including a plurality of cutting tools and a second axis for rotating a workpiece and simultaneously rotating the first axis and the second axis to perform polygon machining, the controller including a machining setting storage unit configured to store the number of cutting tools, a current phase calculation unit configured to calculate phases of the first axis and the second axis rotating before phase alignment, a machining-allowing phase calculation unit configured to calculate a phase designated by a machining program and a phase when an angle of the first axis is shifted by an interval of the plurality of cutting tools from the phase designated by the machining program, an optimum phase calculation unit configured to obtain a phase minimizing a necessary time until phase alignment from a plurality of phases calculated by the machining-allowing phase calculation unit, and a phase alignment control unit configured to control phases so that the first axis and the second axis rotate at phases adjusted to a phase calculated by the optimum phase calculation unit.

A control system of an aspect of the disclosure is a control system for controlling a machine tool having a first axis for rotating a tool including a plurality of cutting tools and a second axis for rotating a workpiece and simultaneously rotating the first axis and the second axis to perform polygon machining, the control system including a machining setting storage unit configured to store the number of cutting tools, a current phase calculation unit configured to calculate phases of the first axis and the second axis rotating before phase alignment, a machining-allowing phase calculation unit configured to calculate a phase designated by a machining program and a phase when an angle of the first axis is shifted by an interval of the plurality of cutting tools from the phase designated by the machining program, an optimum phase calculation unit configured to obtain a phase minimizing a necessary time until phase alignment from a plurality of phases calculated by the machining-allowing phase calculation unit, and a phase alignment control unit configured to control phases so that the first axis and the second axis rotate at phases adjusted to a phase calculated by the optimum phase calculation unit.

A control method of an aspect of the disclosure is a control method for controlling a machine tool having a first axis for rotating a tool including a plurality of cutting tools and a second axis for rotating a workpiece and simultaneously rotating the first axis and the second axis to perform polygon machining, the control method including storing the number of cutting tools, calculating phases of the first axis and the second axis before phase alignment based on a current position of the first axis, a current position of the second axis, and a rotation ratio commanded by the machining program, calculating a plurality of machining-allowing phases based on a rotation ratio designated by the machining program, a phase command value designated by the machining program, and the number of cutting tools, calculating an optimum phase from a difference between a phase before the phase alignment and a phase allowing the machining, a time necessary to change phases of the first axis and the second axis being shortest at the optimum phase, and performing phase alignment of the first axis and the second axis with reference to the optimum phase.

Effect of the Invention

According to an aspect of the invention, in a polygon machining device having a plurality of cutting tools, a time necessary for phase alignment can be shortened.

MODE(S) FOR CARRYING OUT THE INVENTION

Hereinafter, an embodiment in which a controller of the disclosure is implemented in a numerical controller 100 will be illustrated.

Figure 1:
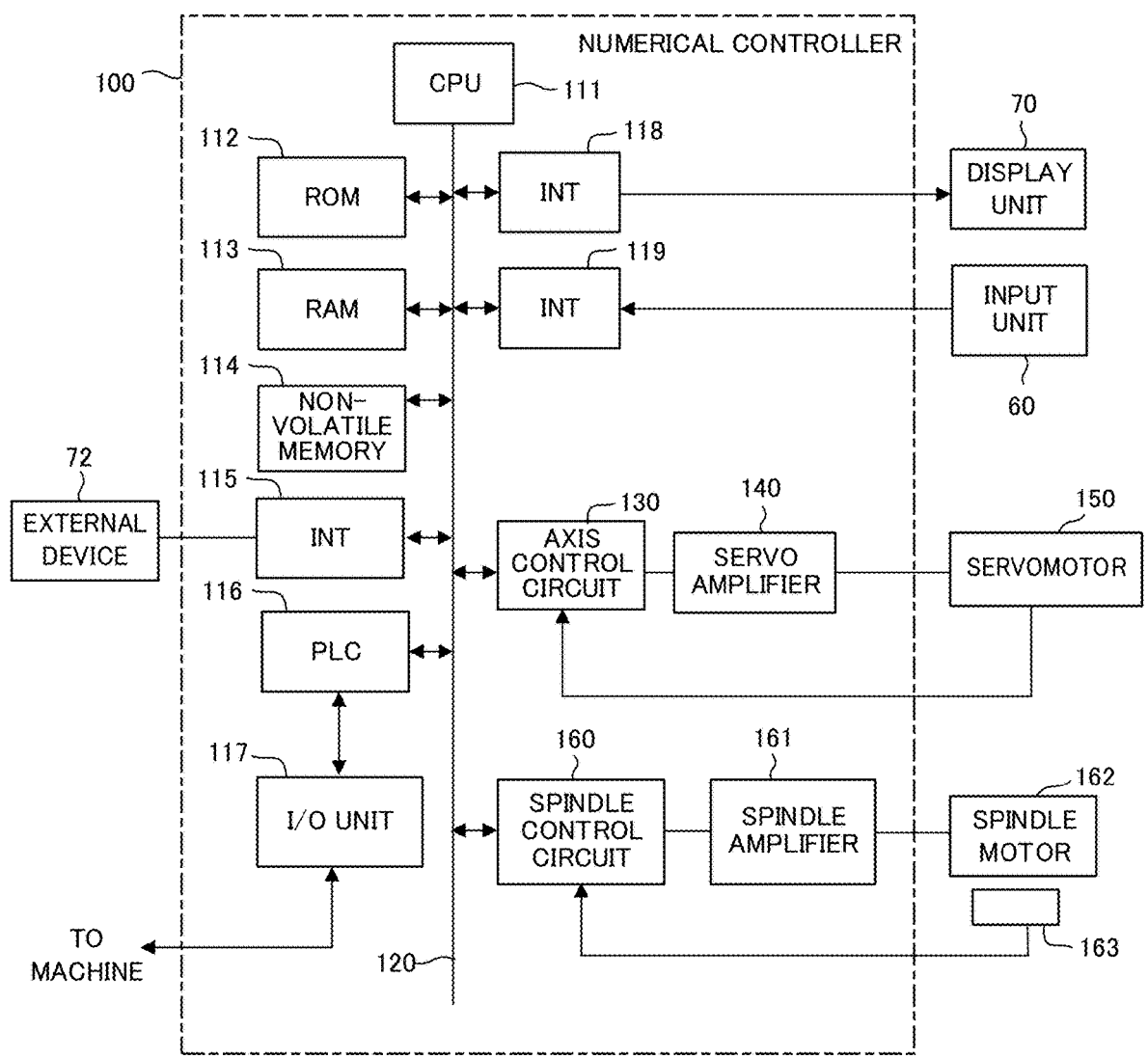
FIG. 1 is a hardware configuration diagram of a numerical controller in the disclosure.

FIG. 1 is a hardware configuration diagram of the numerical controller 100 according to the embodiment.

A CPU 111 included in the numerical controller 100 according to the present embodiment is a processor that controls the numerical controller 100 as a whole. The CPU 111 reads a system program stored in a ROM 112 via a bus 120, and controls the entire numerical controller 100 according to the system program. Temporary calculation data, display data, various data input by an operator via an input unit 30, etc. are temporarily stored in a RAM 113.

A non-volatile memory 114 includes, for example, a memory backed up by a battery (not illustrated), an SSD (Solid State Drive), etc. The non-volatile memory 114 retains a storage state even when the power of the numerical controller 100 is turned off. The non-volatile memory 114 stores a program read from an external device 72 via an interface 115 and a program input via the input unit 30. Further, the non-volatile memory 114 stores various data (for example, setting parameters acquired from a machine tool) acquired from each unit of the numerical controller 100, the machine tool, etc. The program and various data stored in the non-volatile memory 114 may be loaded in the RAM 113 during execution/use. Further, various system programs such as a known analysis program are written to the ROM 112 in advance.

The interface 115 is an interface for connecting the numerical controller 100 and the external device 72 such as an adapter to each other. Programs, various parameters, etc. are read from the external device 72 side. Further, a program edited in the numerical controller 100, various parameters, etc. can be stored in an external storage means via the external device 72. A PLC (programmable logic controller) 116 inputs and outputs, using a sequence program built in the numerical controller 100, a signal via an I/O unit 117 between the PLC 116 and a device such as a machine tool or a robot, or a sensor attached to the machine tool or the robot, and controls them.

Various data read on a memory, data obtained as a result of executing a program, etc. are output via an interface 118 and displayed on a display unit 70. Further, the input unit 30 including an MDI, an operation panel, a touch panel, etc. delivers commands, data, etc. based on an operation by an operator to the CPU 111 via an interface 119.

An axis control circuit 130 for controlling each axis of the machine tool receives an axis movement command from the CPU 111 and outputs the axis command to a servo amplifier 140. The servo amplifier 140 receives this command and drives a servomotor 150 that moves an axis included in the machine tool. The servomotor 150 of the axis includes a position/speed detector, feeds back a position/speed feedback signal from the position/speed detector to the axis control circuit 130, and performs position/speed feedback control. Note that in the hardware configuration diagram of FIG. 1, only one axis control circuit 130, one servo amplifier 140, and one servomotor 150 are illustrated. However, in practice, each of the number of prepared axis control circuits 130, the number of prepared servo amplifiers 140, and the number of prepared servomotors 150 is the number of axes included in the machine tool to be controlled. A functional block diagram (FIG. 2) described later illustrates an example in which at least two servomotors, one for the workpiece axis and the other for the tool axis, are present.

A spindle control circuit 160 receives a spindle rotation command for rotating the spindle of the machine tool, and outputs a spindle speed signal to a spindle amplifier 161. The spindle amplifier 161 receives the spindle speed signal and rotates a spindle motor 162 of the spindle at a commanded rotation speed. A position coder 163 is coupled to the spindle motor 162, and the position coder 163 outputs a feedback pulse in synchronization with rotation of the spindle. The output feedback pulse is read by the CPU 111.

Figure 2:
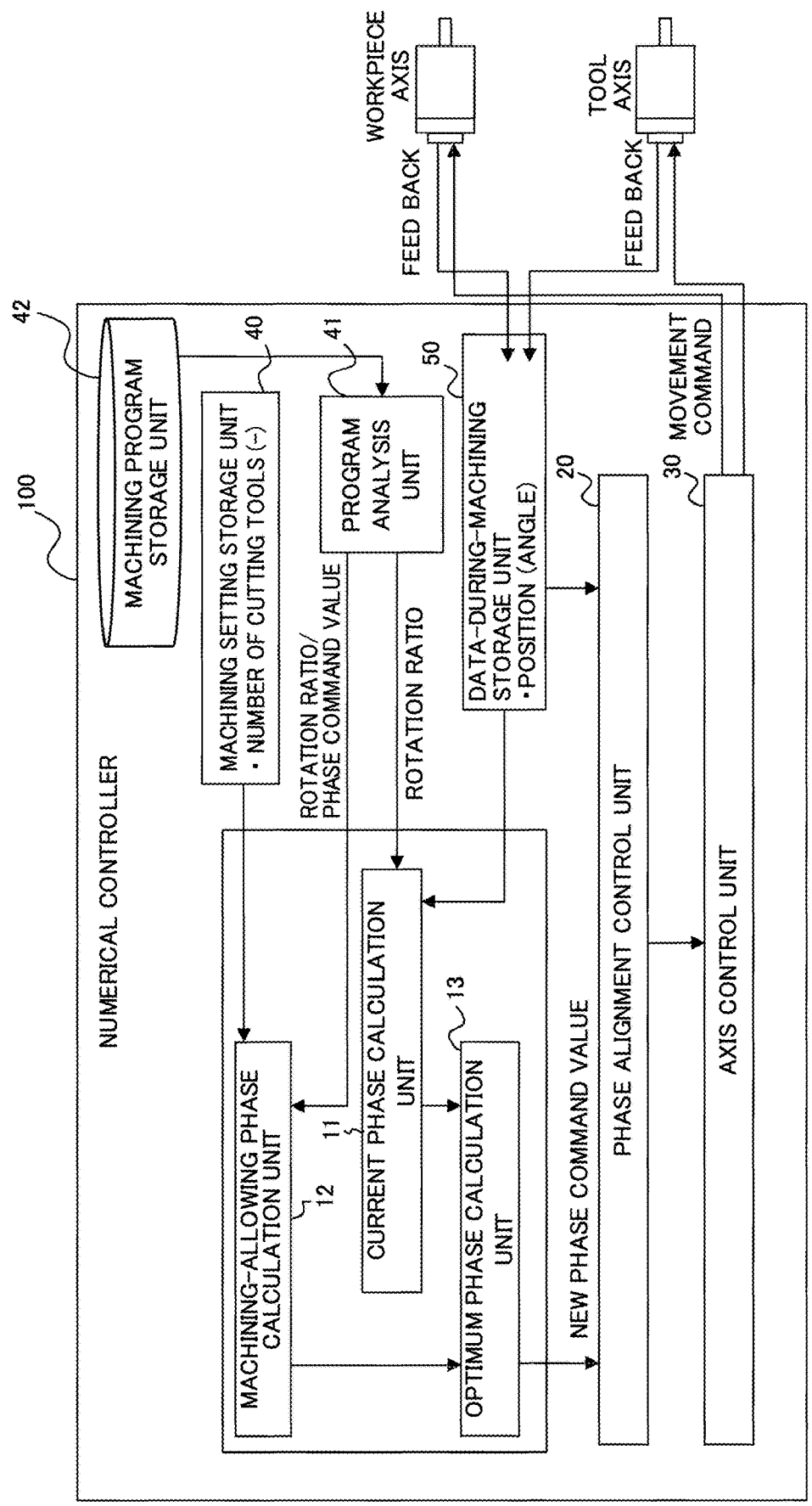
FIG. 2 is a block diagram of the numerical controller in the disclosure.

FIG. 2 is a block diagram of the numerical controller 100 according to the embodiment of the disclosure. The numerical controller 100 includes a current phase calculation unit 11, a machining-allowing phase calculation unit 12, an optimum phase calculation unit 13, a program analysis unit 41, a phase alignment control unit 20, an axis control unit 30, a machining setting storage unit 40, a data-during-machining storage unit 50, and a machining program storage unit 42.

The numerical controller 100 is connected to a machine tool that performs polygon machining. The machine tool that performs polygon machining has a tool axis as a first axis and a workpiece axis as a second axis, a workpiece is attached to the workpiece axis, and a tool is attached to the tool axis. The servomotor 150 is attached to the tool axis and the workpiece axis, and the servo amplifier 140 performs phase alignment of the servomotor 150 according to a command from the phase alignment control unit 20.

The machining setting storage unit 40 stores the number T of cutting tools attached to the tool axis.

The program analysis unit 41 extracts a rotation ratio P:Q of the workpiece and the tool and a phase command value R (angle) from a machining program. The phase command value R is a command for designating a phase difference between the tool axis and the workpiece axis.

The data-during-machining storage unit 50 stores positions (angles) of the workpiece axis and the tool axis during machining. The positions of the workpiece axis and the tool axis are fed back from the servo amplifier 140.

The current phase calculation unit 11 calculates phase $R_{CURRENT}$ of the workpiece axis and the tool axis before phase alignment from a current position X of the workpiece axis and a current position Y of the tool axis stored in the data-during-machining storage unit 50 and a rotation ratio output from the program analysis unit 41.

The machining-allowing phase calculation unit 12 calculates a phase difference between the workpiece axis and the tool axis satisfying a machining-allowing condition from the number T of cutting tools stored in the machining setting storage unit 40, and a rotation ratio and a phase command value output from the program analysis unit 41. The number of phase differences satisfying this condition is the same as the number of cutting tools.

The optimum phase calculation unit 13 calculates the change amount when the phases of the workpiece axis and the tool axis are changed until a phase difference satisfying the machining-allowing condition is obtained while considering whether the workpiece axis and the tool axis can be accelerated or decelerated, respectively. The optimum phase calculation unit 13 determines a new phase command value from a phase difference that minimizes the change amount when the phases are changed.

The phase alignment control unit 20 outputs the movement amounts of the workpiece axis and the tool axis to the axis control unit 30 based on the current position X of the workpiece axis and the current position Y of the tool axis stored in the data-during-machining storage unit 50 and a new phase command value calculated by the optimum phase calculation unit 13.

The axis control unit 30 outputs an axis movement command to each of the tool axis and the workpiece axis. The servomotor 150 controls the tool axis and the workpiece axis according to the axis movement command. Position information X and Y of the tool axis and the workpiece axis are fed back to the numerical controller 100.

In polygon machining of the disclosure, a new phase command value is calculated, and polygon machining is performed using this phase command value. By performing phase alignment using a phase command value that minimizes the change amount when changing the phase, it is possible to shorten a time necessary for phase alignment.

Hereinafter, phase alignment of polygon machining of the disclosure will be described while comparing with conventional phase alignment of polygon machining.

[Conventional Phase Alignment]

Figure 3:
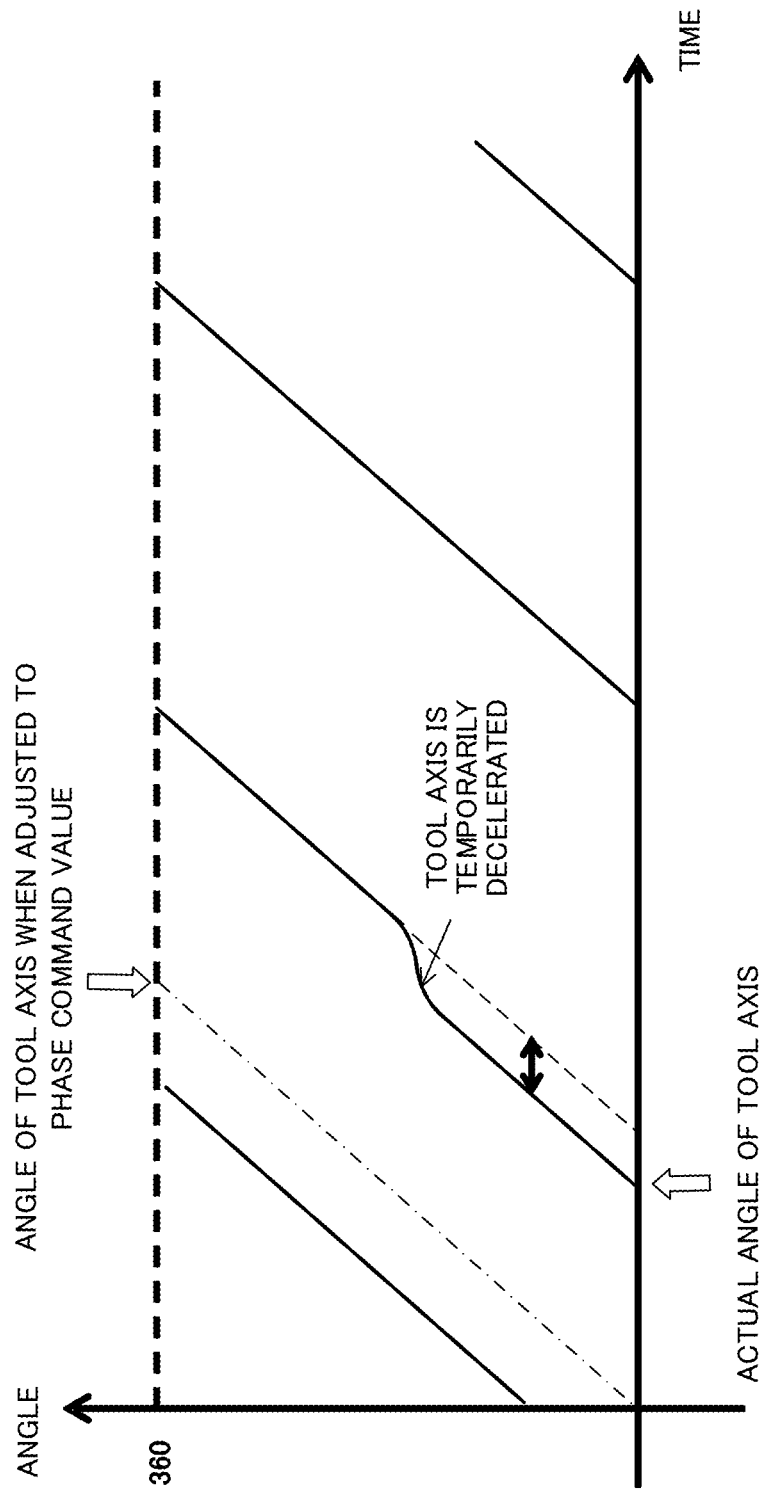
FIG. 3 is a diagram when a tool axis is temporarily decelerated to perform phase alignment.
Figure 4:
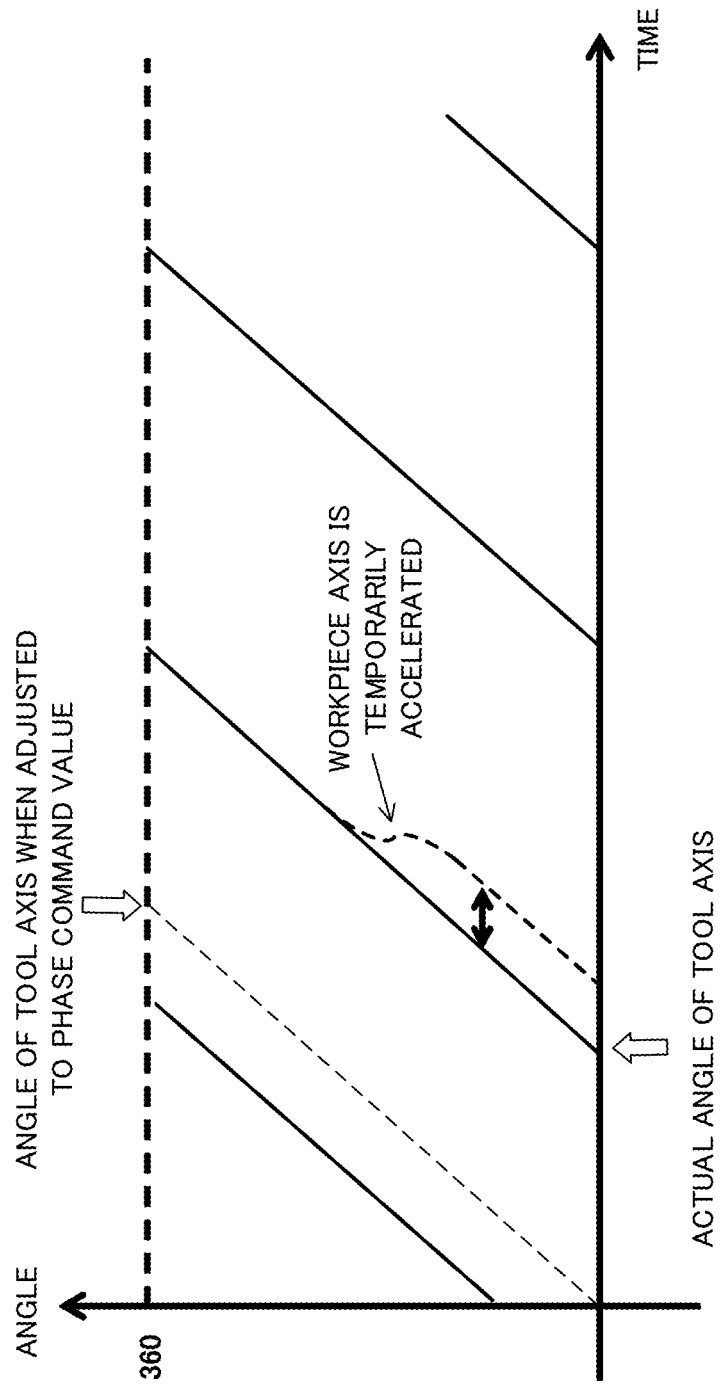
FIG. 4 is a diagram when a workpiece axis is temporarily accelerated to perform phase alignment.

FIGS. 3 and 4 illustrate a temporal change of the tool axis when phase alignment is performed in conventional polygon machining. FIG. 3 is a diagram when the tool axis is decelerated to perform phase alignment. FIG. 4 is a diagram when the workpiece axis is accelerated to perform phase alignment. In these figures, a solid line indicates an actual angle of the tool axis. A broken line indicates an angle of the tool axis when the phase is aligned, which is calculated from a rotation ratio, a phase command value, and an actual angle of the workpiece axis.

Conventionally, by accelerating or decelerating at least one of the workpiece axis and the tool axis from a commanded rotation speed, the phases of the workpiece axis and the tool axis are adjusted to a phase determined by the phase command value.

[Outline of Phase Alignment of Disclosure]

Figure 5:
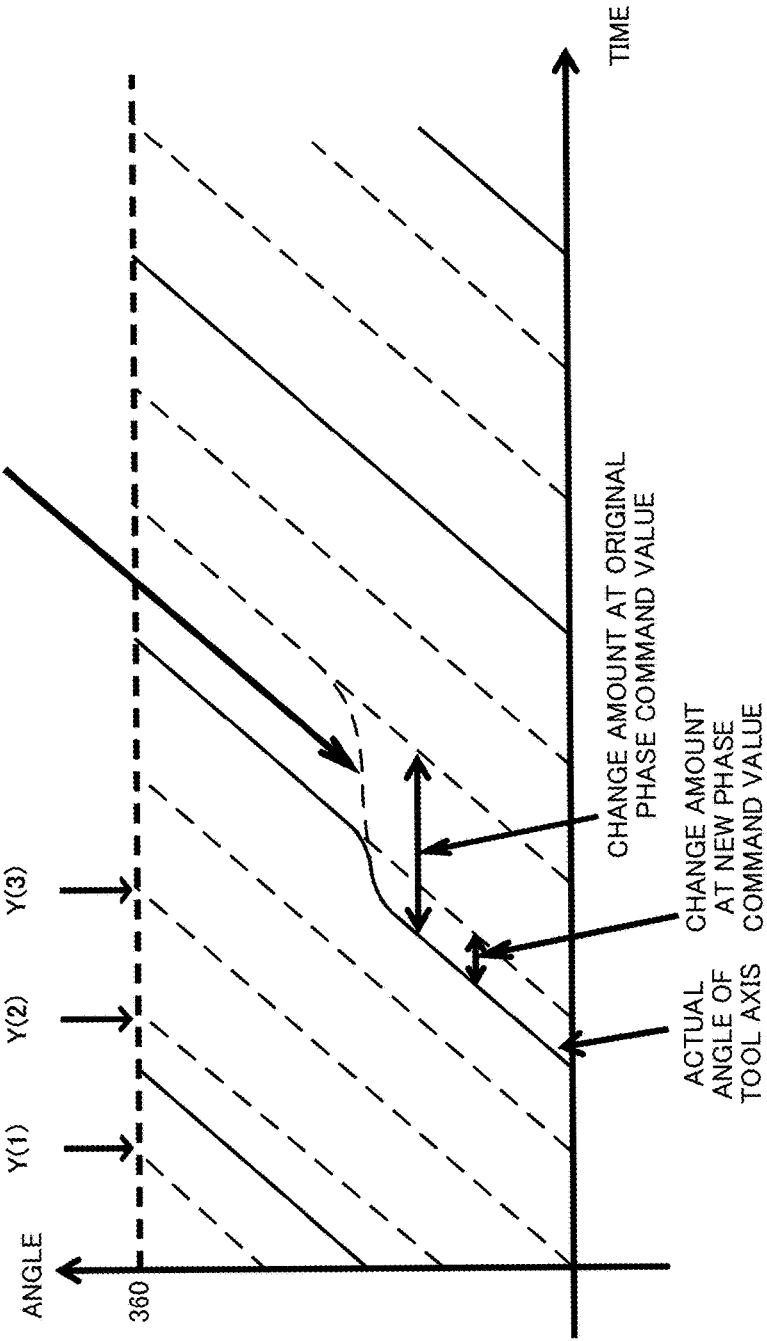
FIG. 5 is a diagram illustrating phase alignment of polygon machining of the disclosure.

FIG. 5 illustrates phase alignment of polygon machining of the disclosure. In polygon machining of the disclosure, a phase difference between the workpiece axis and the tool axis satisfying the machining-allowing condition is calculated. Three types of broken lines illustrated in FIG. 5 indicate an angle of the tool axis when coinciding with the phase of the phase command value commanded by a machining program, and an angle of the tool axis when the angle is shifted by an interval of the cutting tools from the angle. In FIG. 5, the number of cutting tools is three.

In an example of FIG. 5, the actual tool axis is temporarily decelerated to align with a phase when shifted by 240 degrees from an angle of the tool axis when coinciding with a phase of a phase command value commanded by a machining program. By selecting a phase command value with which a phase having a small phase change amount is obtained, it is possible to shorten a time necessary for phase alignment.

[Description of Phase Alignment of Disclosure]

Phase alignment of the disclosure will be specifically described. As a premise, a rotation ratio P:Q is defined as the tool axis Q-rotating while the workpiece axis P-rotates. Further, when the rotation ratio P:Q and the phase command value R are designated, and the current position of the workpiece shift is set to X and the current position of the tool axis is set to Y in a state of phase coincidence, the workpiece axis and the tool axis rotate at a designated rotation speed so that X and Y constantly satisfy the following Equation (1).

$$Y = \frac{Q}{P} \times X + R \qquad \text{[Equation 1]}$$

In the above equation, it is assumed that an arbitrary angle A is equal to an angle obtained by adding a numerical value, which is an integral multiple of 360, to A.

It is assumed that the workpiece axis and the tool axis immediately before phase alignment are rotating at the commanded rotation speed while satisfying the rotation ratio P:Q.

In the following description, the origin (zero point) of the axis is a position pointed to by an arrow at the top of the figure. The position on the axis is rounded to zero for each rotation (more than 360°).

In alignment of the disclosure, first, the phase $R_{CURRENT}$ of the workpiece axis and the tool axis before phase alignment are calculated.

When the current position of the workpiece axis is set to X and the current position of the tool axis is set to Y, the phase $R_{CURRENT}$ can be calculated from Equation 22 from the rotation ratio P:Q as follows.

$$R_{CURRENT} = Y - \frac{Q}{P} \times X \quad \text{[Equation 2]}$$

In the case where a plurality of cutting tools is present, when the tool is rotated by an interval of the cutting tools, the order of the cutting tools is merely changed, and positions where the cutting tools are located do not change. For this reason, even when machining is performed in a state where the tool axis is shifted by the interval of the cutting tools from a state of coincidence, a machining result is the same as that of the state of coincidence. When the number of cutting tools is set to T, a phase resulting in a machining result designated by the phase command value may be expressed as follows from Equation 1.

$$Y = \frac{Q}{P} \times X + R + \frac{360}{T} \times n(n: 0 \sim T - 1) \quad \text{[Equation 3]}$$

From the above Equation 3, the phase command value R of Equation 1 can be replaced with a phase command value $R_{NEW}(n)$ as illustrated in the following Equation 4.

$$R_{NEW}(n) = R + \frac{360}{T} \times n(n: 0 \sim T - 1) \quad \text{[Equation 4]}$$

Among machining-allowing phase command values $R_{NEW}(n)$ obtained by Equation 4, a new phase command values $R'_{NEW}$, which minimizes the amount of change in phase when performing phase alignment, is calculated from the phase $R_{CURRENT}$ of the workpiece axis and tool axis before phase alignment obtained by Equation 2, and is used by the phase alignment control unit 20.

For example, when the workpiece axis and the tool axis can be freely controlled, the change amount of the phase is the smallest when a difference between the phase command values before and after phase alignment is the smallest. Further, when the tool axis can only be temporarily decelerated to change the phase, the phase $R_{CURRENT}$ can be changed only in a direction of decreasing. Therefore, the phase command value closest to the above direction can minimize the change amount of the phase.

Example of Calculation of Phase Alignment of Disclosure

Figure 6:
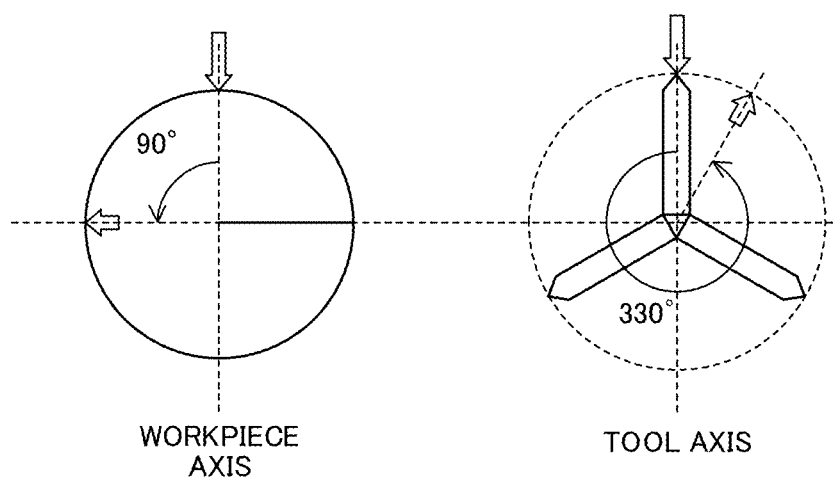
FIG. 6 is a diagram illustrating a relationship among a current position X of a workpiece, a current position Y of a tool, and the number of tools T.

Phase alignment of the disclosure will be described using actual numerical values. The machining setting storage unit 40 stores the number of cutting tools T=3. In the machining program, the rotation ratio is specified as 1:2 and the phase command value is specified as R=60. It is assumed that the current position of the workpiece axis is X=90, and the current position of the tool axis is Y=330 before start of phase alignment. FIG. 6 illustrates a relationship among the current position X of the workpiece, the current position Y of the tool, and the number T of tools.

As illustrated in FIG. 6, the current position X of the workpiece is a position of 90° counterclockwise from the origin of the workpiece axis (a position pointed by an arrow at the top of the figure). The current position Y of the tool is a position of 330° counterclockwise from the origin of the tool axis.

The phase $R_{CURRENT}$ of the workpiece axis and the tool axis before phase alignment can be calculated as follows by substituting the current position X of the workpiece, the current position Y of the tool, and the rotation ratio 1:2 into Equation 2.

$$\begin{aligned} R_{CURRENT} &= Y - \frac{Q}{P} \times X \\ &= 330 - 2 \times 90 \\ &= 150 \end{aligned} \quad \text{[Equation 5]}$$

When the current position X of the workpiece, the current position Y of the tool, the rotation ratio 1:2, and the phase command value R are substituted into Equation 4, the machining-allowing phase command value $R_{NEW}(n)$ can be calculated as follows. There are values of $R_{NEW}(n)$, the number of which is the number of cutting tools.

$$\begin{aligned} R_{NEW}(n) &= R + \frac{360}{T} \times n(n = 1, 2, 3) \\ &= 60 - 120 \times n \\ &= 60, -60, -180 \\ &= 60, 300, 180 \end{aligned} \quad \text{[Equation 6]}$$

The amount of change in phase is obtained in consideration of restrictions such as a phase alignment method and a maximum rotation speed of the workpiece axis and tool axis. However, when there are no such restrictions, a value of $R_{NEW}(n)$ closest to $R_{CURRENT}$ is a new phase command value $R'_{NEW}$. The phase alignment control unit 20 performs phase alignment using the new phase command value $R'_{NEW}$.

Figure 7:
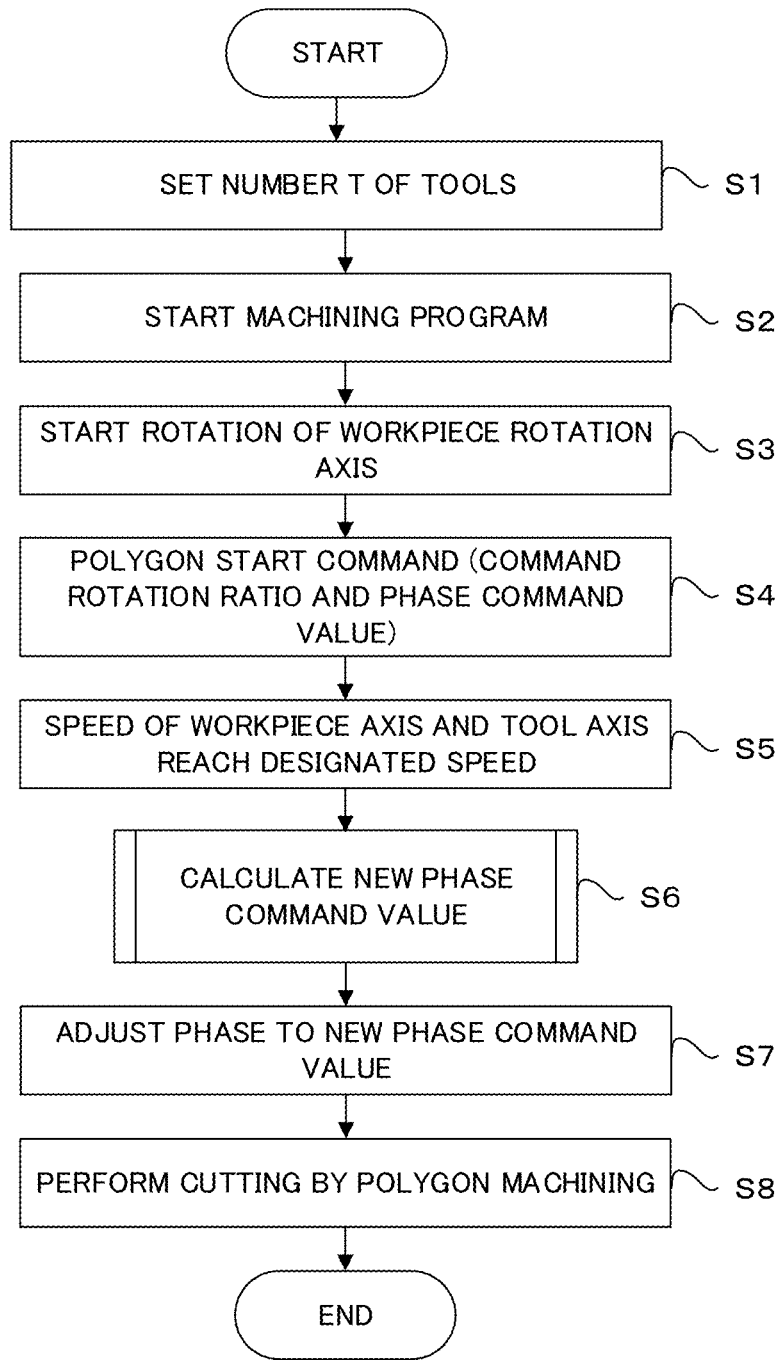
FIG. 7 is a flowchart describing a phase alignment method of the disclosure.

Next, a phase alignment method of the numerical controller 100 of the disclosure will be described with reference to FIG. 7. Before starting the machining program, the number of cutting tools is set. Here, the number of cutting tools is set to T=3 (step S1).

Subsequently, the machining program is started (step S2). The program analysis unit 41 analyzes the machining program and first starts rotation of a workpiece rotation axis (step S3). Further, the program analysis unit 41 analyzes a command for starting polygon machining at a rotation ratio P:Q=1:2 of the workpiece and the tool and a phase command value R=60 (step S4). The axis control unit 30 rotates the workpiece axis and the tool axis in accordance with the command of the machining program.

When the workpiece axis and the tool axis reach a designated speed for polygon machining (step S5), calculation of a new phase command value $R'_{NEW}$ is started (step S6).

When the new phase command value $R'_{NEW}$ is determined, the tool axis or the workpiece axis is temporarily decelerated or accelerated to adjust the phase to the new phase command value $R'_{NEW}$ (step S7). When phase alignment is completed, cutting by polygon machining is performed (step S8).

Figure 8:
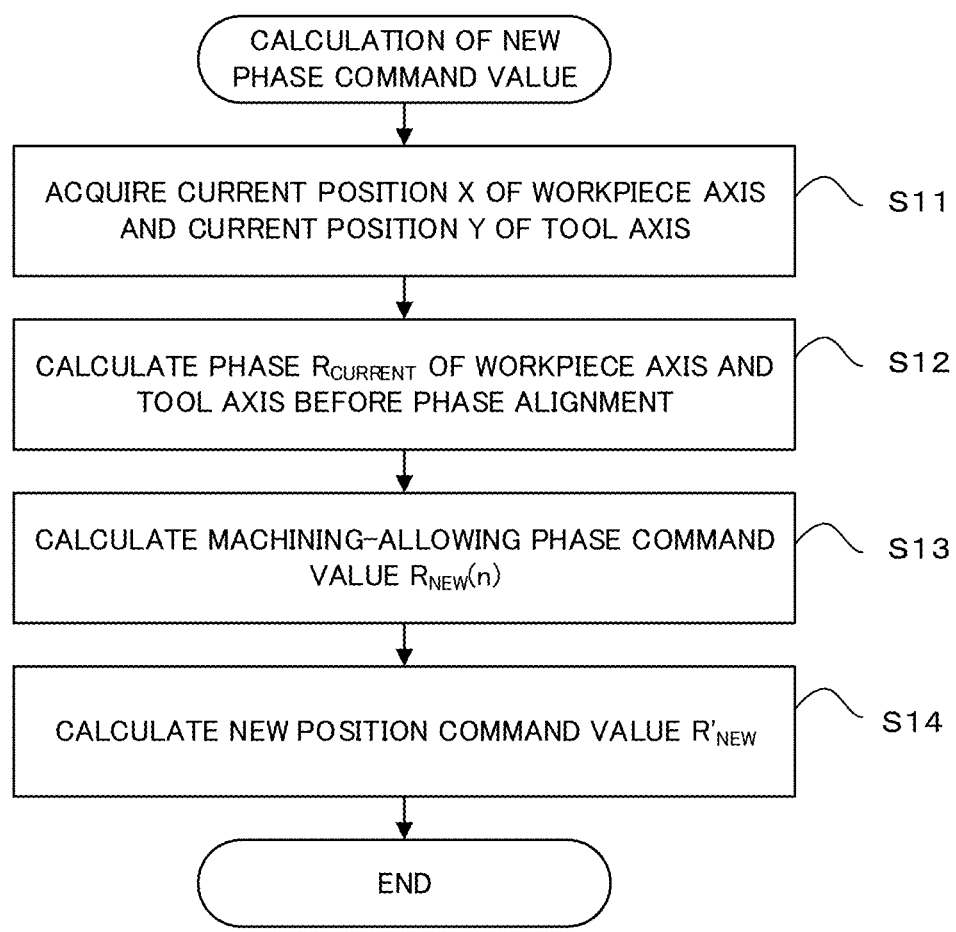
FIG. 8 is a flowchart describing a procedure for calculating a new phase command value $R'_{NEW}$.

A procedure for calculating the new phase command value $R'_{NEW}$ in step S6 will be described with reference to FIG. 8. In calculation of the new phase command value, the current position X of the workpiece axis and the current position Y of the tool axis are acquired (step S11), and the phase $R_{CURRENT}$ of the workpiece axis and the tool axis before phase alignment is calculated (step S12). Then, the machining-allowing phase calculation unit 12 calculates the machining-allowing phase command value $R_{NEW}(n)$ using the number T of the cutting tools (step S13). The number of values of $R_{NEW}(n)$ equals the number T of cutting tools. The optimum phase calculation unit 13 selects a new phase command value $R'_{NEW}$ that minimizes the amount of change when changing the phase, while considering restrictions such as the phase alignment method and the maximum rotation speed of the workpiece axis and the tool axis (step S14).

Figure 9A:
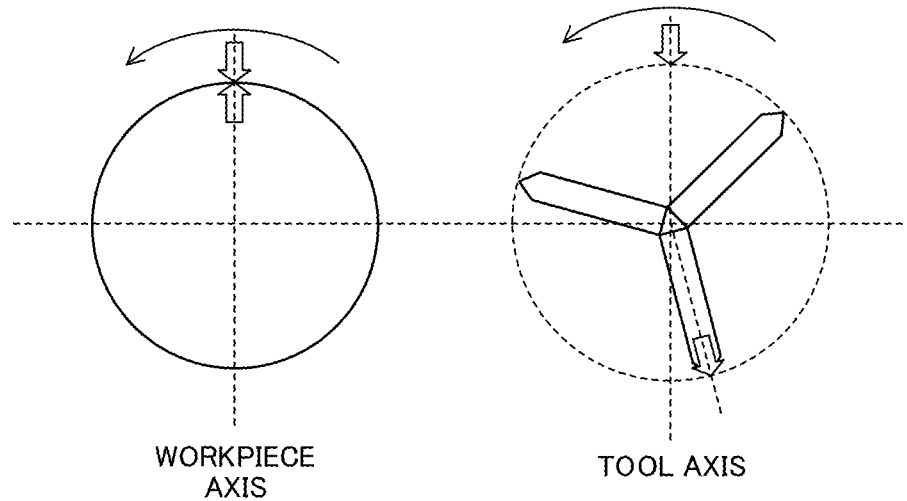
FIG. 9A is a diagram describing conventional phase alignment.
Figure 9B:
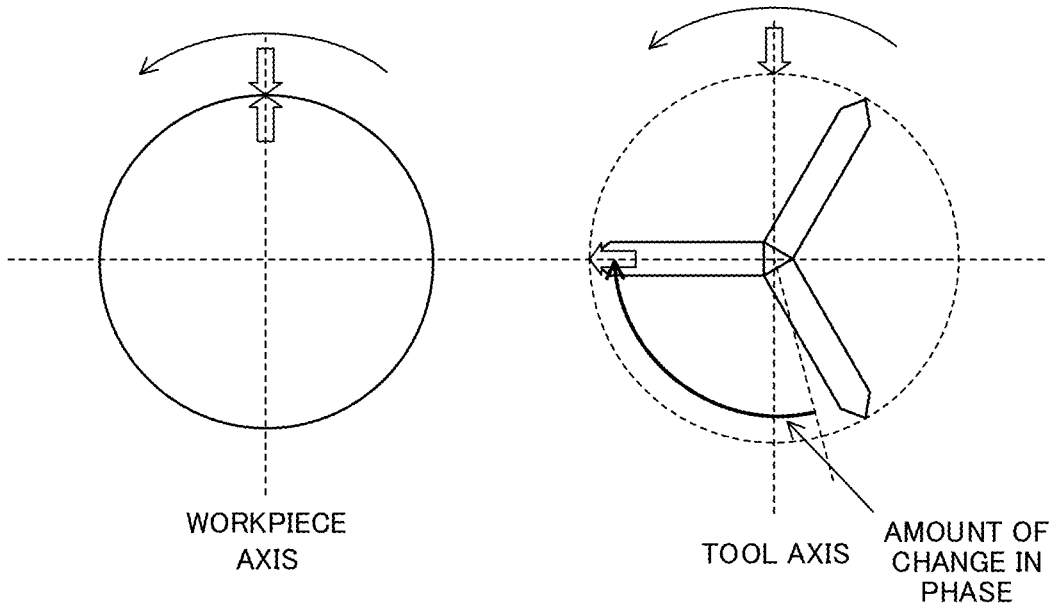
FIG. 9B is a diagram describing conventional phase alignment.
Figure 10A:
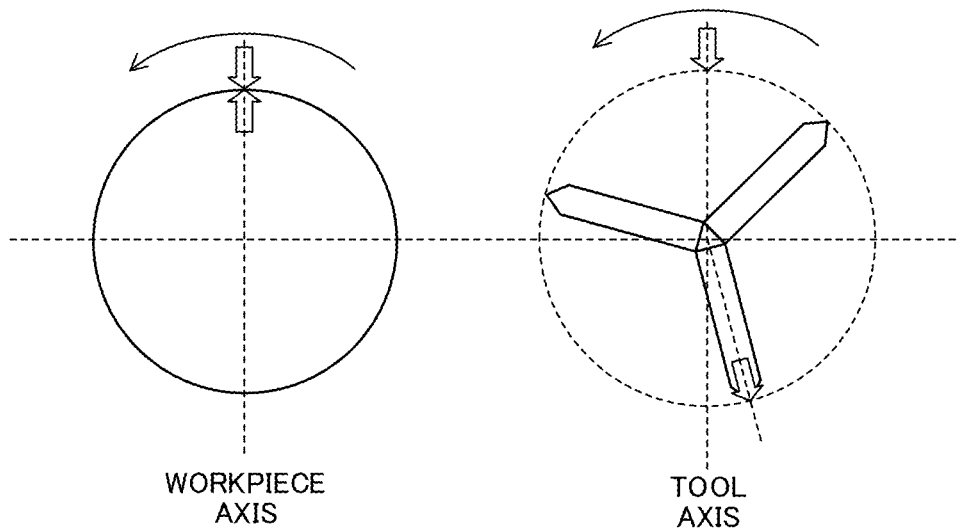
FIG. 10A is a diagram describing phase alignment of the disclosure.
Figure 10B:
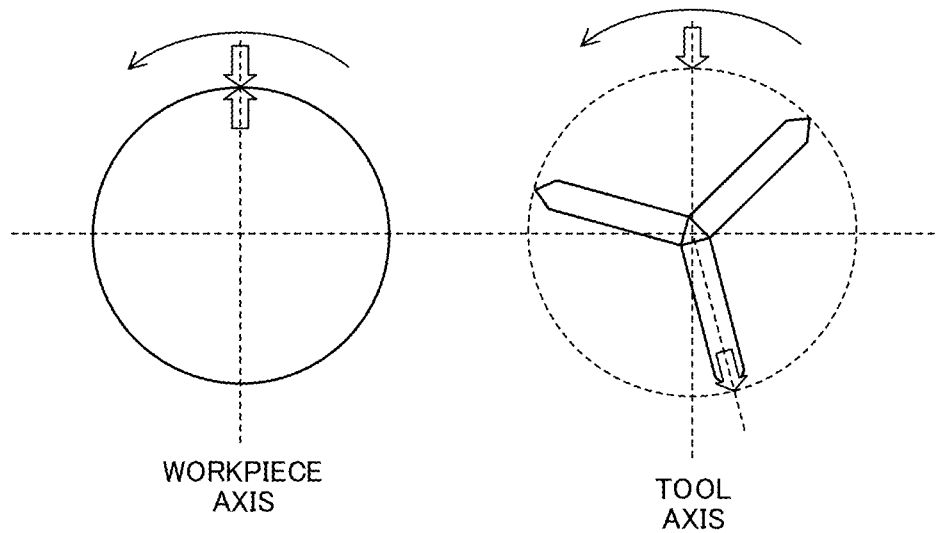
FIG. 10B is a diagram describing phase alignment of the disclosure.
Figure 10C:
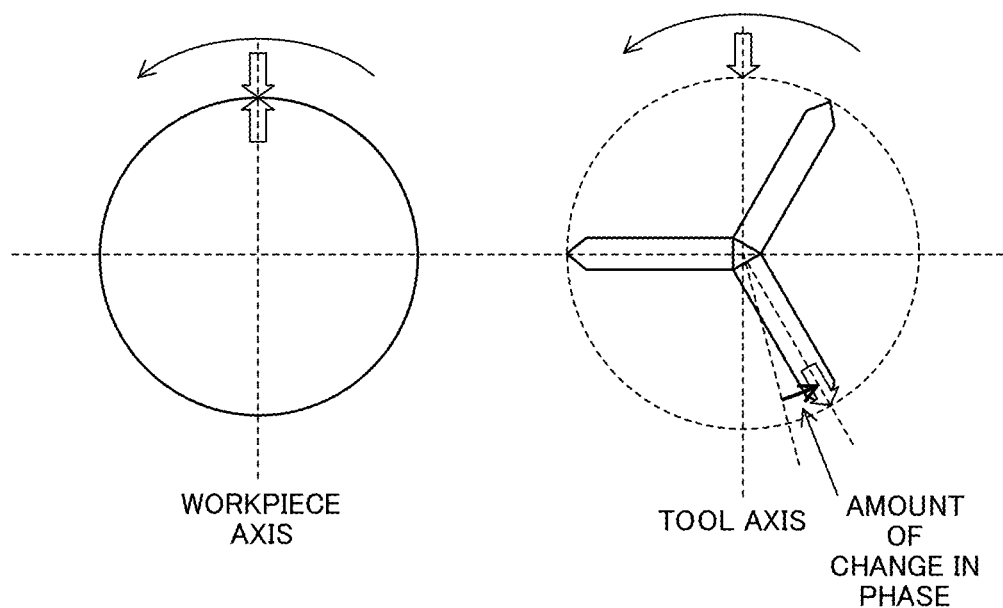
FIG. 10C is a diagram describing phase alignment of the disclosure.
Figure 11A:
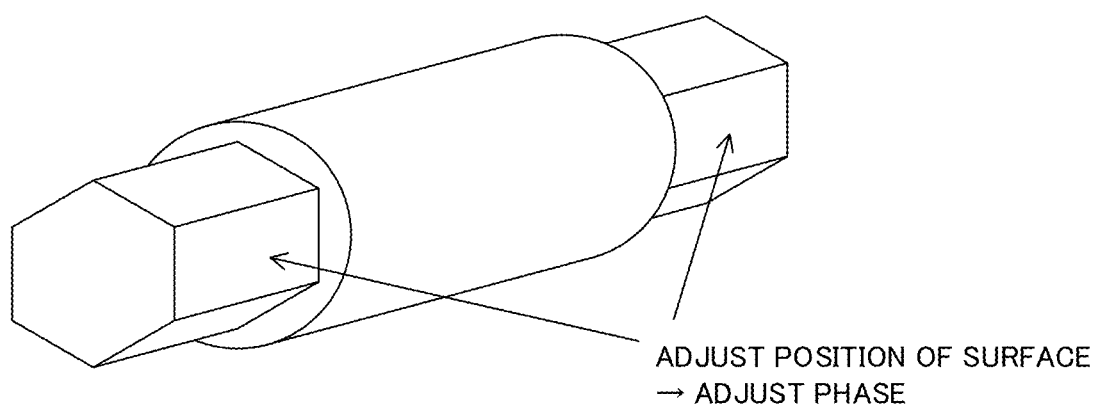
FIG. 11A is a diagram describing necessity of phase alignment in polygon machining.
Figure 11B:
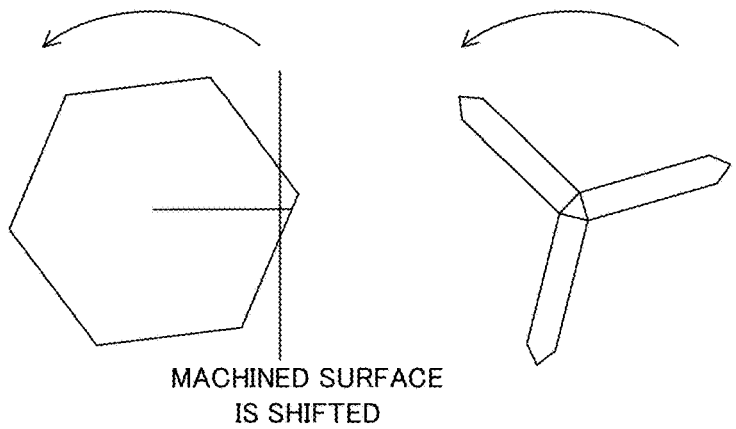
FIG. 11B is a diagram describing necessity of phase alignment in polygon machining.
Figure 11C:
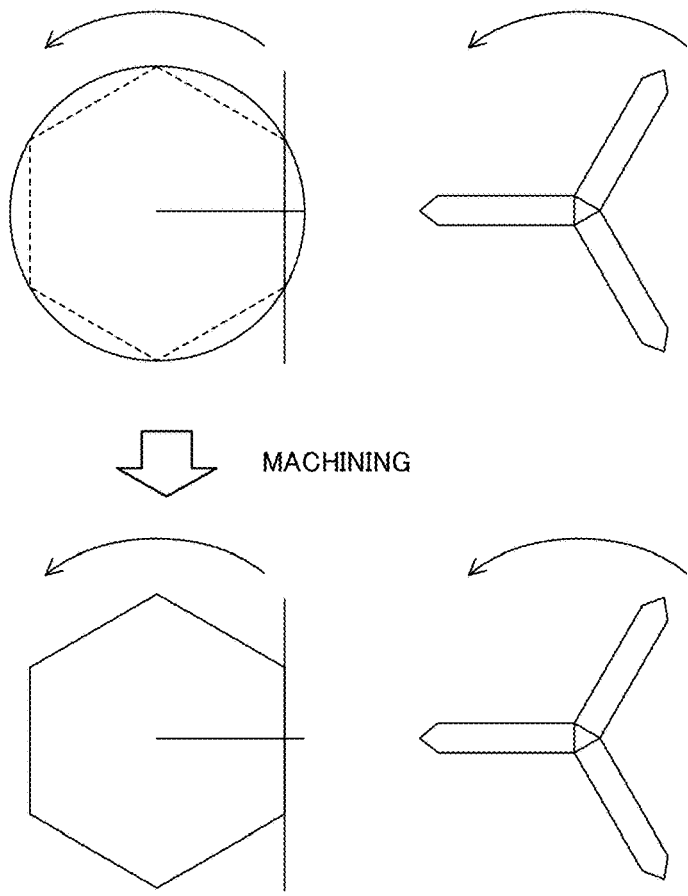
FIG. 11C is a diagram describing necessity of phase alignment in polygon machining.

FIGS. 9A and 9B illustrate conventional phase alignment, and FIGS. 10A to 10C illustrate phase alignment of the disclosure. Each of FIGS. 9A and 9B and FIGS. 10A to 10C illustrates the amount of change in phase when the workpiece axis is 0 degrees and the tool axis is 195 degrees. Conventionally, phase alignment is performed based on the phase (phase command value R) commanded during machining. For this reason, under the above condition, as illustrated in FIG. 10A, the phase command value becomes 90 degrees.

Since polygon machining has a plurality of cutting tools, there is no problem in performing phase alignment at a phase obtained by shifting the angle of the tool axis by an interval of the cutting tools. Therefore, the number of appropriate phases equals the number of cutting tools.

In the disclosure, as illustrated in FIG. 10B, an appropriate phase is selected from a plurality of phases so that a time necessary for phase alignment is the shortest (the amount of change in phase is the smallest). In an example of FIG. 10C, the amount of change in phase is reduced by changing the phase command value from 90 degrees to 210 degrees.

As described above, the numerical controller 100 of the disclosure calculates the phase $R_{CURRENT}$ of the workpiece axis and the tool axis before phase alignment and the machining-allowing phase command value $R_{NEW}(n)$ in phase alignment of polygon machining, and calculates the new phase command value $R'_{NEW}$ while considering restrictions such as the phase alignment method and the maximum rotation speed. The amount of change of the tool axis or workpiece axis is shortened, and the time necessary for phase alignment is shortened.

EXPLANATIONS OF LETTERS OR NUMERALS

100 NUMERICAL CONTROLLER
111 CPU
11 CURRENT PHASE CALCULATION UNIT
12 MACHINING-ALLOWING PHASE CALCULATION UNIT
13 OPTIMUM PHASE CALCULATION UNIT
20 PHASE ALIGNMENT CONTROL UNIT
30 AXIS CONTROL UNIT
40 MACHINING SETTING STORAGE UNIT
41 PROGRAM ANALYSIS UNIT
42 MACHINING PROGRAM STORAGE UNIT
50 DATA-DURING-MACHINING STORAGE UNIT

The invention claimed is:

1. A controller for controlling a machine tool having a first axis for rotating a tool including a plurality of cutting tools and a second axis for rotating a workpiece and simultaneously rotating the first axis and the second axis to perform polygon machining, the controller comprising:
   a machining setting storage unit configured to store the number of cutting tools;
   a current phase calculation unit configured to calculate phases of the first axis and the second axis rotating before phase alignment;
   a machining-allowing phase calculation unit configured to calculate a phase designated by a machining program and a phase when an angle of the first axis is shifted by an interval of the plurality of cutting tools from the phase designated by the machining program;
   an optimum phase calculation unit configured to obtain a phase minimizing a necessary time until phase alignment from a plurality of phases calculated by the machining-allowing phase calculation unit; and
   a phase alignment control unit configured to control phases so that the first axis and the second axis rotate at phases adjusted to a phase calculated by the optimum phase calculation unit.

2. The controller according to claim 1, wherein the current phase calculation unit calculates phases of the first axis and the second axis before phase alignment based on a current position of the first axis, a current position of the second axis, and a rotation ratio commanded by the machining program.

3. The controller according to claim 1, wherein the machining-allowing phase calculation unit calculates a plurality of machining-allowing phases based on a rotation ratio designated by the machining program, a phase command value designated by the machining program, and the number of cutting tools.

4. The controller according to claim 3, wherein the optimum phase calculation unit calculates an optimum phase from a difference between a phase before the phase alignment and a phase allowing the machining, a time necessary to change phases of the first axis and the second axis being shortest at the optimum phase.

5. A control system for controlling a machine tool having a first axis for rotating a tool including a plurality of cutting tools and a second axis for rotating a workpiece and simultaneously rotating the first axis and the second axis to perform polygon machining, the control system comprising:
   a machining setting storage unit configured to store the number of cutting tools;
   a current phase calculation unit configured to calculate phases of the first axis and the second axis rotating before phase alignment;
   a machining-allowing phase calculation unit configured to calculate a phase designated by a machining program and a phase when an angle of the first axis is shifted by an interval of the plurality of cutting tools from the phase designated by the machining program;
   an optimum phase calculation unit configured to obtain a phase minimizing a necessary time until phase alignment from a plurality of phases calculated by the machining-allowing phase calculation unit; and a phase alignment control unit configured to control phases so that the first axis and the second axis rotate at phases adjusted to a phase calculated by the optimum phase calculation unit.

6. A control method for controlling a machine tool having a first axis for rotating a tool including a plurality of cutting tools and a second axis for rotating a workpiece and simultaneously rotating the first axis and the second axis to perform polygon machining, the control method comprising:

storing the number of cutting tools;

calculating phases of the first axis and the second axis before phase alignment based on a current position of the first axis, a current position of the second axis, and a rotation ratio commanded by the machining program;

calculating a plurality of machining-allowing phases based on a rotation ratio designated by the machining program, a phase command value designated by the machining program, and the number of cutting tools;

calculating an optimum phase from a difference between a phase before the phase alignment and a phase allowing the machining, a time necessary to change phases of the first axis and the second axis being shortest at the optimum phase; and performing phase alignment of the first axis and the second axis with reference to the optimum phase.

* * * * *